(12) United States Patent
MacLeod et al.

(10) Patent No.: US 6,530,529 B2
(45) Date of Patent: Mar. 11, 2003

(54) METHOD AND SYSTEM FOR REGULATING HYDRAULIC PRESSURE IN HEAVY EQUIPMENT

(75) Inventors: Ian J. MacLeod, Ames, IA (US); Guy T. Stoever, Naperville, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/972,143

(22) Filed: Oct. 5, 2001

(65) Prior Publication Data

US 2002/0053602 A1 May 9, 2002

Related U.S. Application Data

(60) Provisional application No. 60/245,894, filed on Nov. 3, 2000.

(51) Int. Cl.[7] .......................... G05D 23/12; G05D 23/00
(52) U.S. Cl. ................................... 236/93 R; 236/99 K
(58) Field of Search .............................. 236/93 R, 93 A, 236/99 J, 99 K

(56) References Cited

U.S. PATENT DOCUMENTS

| | | | | |
|---|---|---|---|---|
| 2,830,767 A | * | 4/1958 | Herbenar | 137/119.01 |
| 3,378,063 A | * | 4/1968 | Mefferd | 123/552 |
| 4,336,903 A | * | 6/1982 | Zirps | 137/468 |
| 4,488,680 A | * | 12/1984 | Itoh | 236/100 |
| 4,788,828 A | * | 12/1988 | Sato | 236/93 A |
| 5,011,075 A | * | 4/1991 | Vandiver | 138/45 |
| 5,110,045 A | * | 5/1992 | Glasson et al. | 137/625.46 |
| 5,579,995 A | * | 12/1996 | Giasson et al. | 236/93 R |
| 5,641,119 A | * | 6/1997 | Simonette | 236/100 |
| 6,058,730 A | * | 5/2000 | Giasson et al. | 236/101 D |

* cited by examiner

*Primary Examiner*—William E. Tapolcai
(74) *Attorney, Agent, or Firm*—A. N. Trausch

(57) ABSTRACT

The invention provides a method and system for regulating pressure equalization in hydraulic mechanisms. The system includes a main body, a thermal element positioned within the main body, a pin positioned adjacent to the thermal element, and an orifice spool in communication with the pin. The thermal element expands to force the pin to reposition the orifice spool, and restrict fluid flow through the main body. The method includes expanding a thermal polymer when temperature increases, contracting the thermal polymer when the temperature decreases, and metering fluid flow based on the expanding and contracting of the thermal polymer.

37 Claims, 2 Drawing Sheets

METHOD AND SYSTEM FOR REGULATING HYDRAULIC PRESSURE IN HEAVY EQUIPMENT

This application claims the benefit of provisional application No. 60/245,894, filed Nov. 3, 2000.

FIELD OF THE INVENTION

In general, the invention relates to hydraulic systems used in the operation of heavy equipment. More specifically, the invention relates to electro-hydraulic or hydraulic systems used for regulating pressure in the operation of heavy equipment, including but not limited to backhoes, excavators, skid steer drives, crawler drives, outriggers, and wheel loaders.

BACKGROUND OF THE INVENTION

In general, heavy equipment used in construction trades and industry employ hydraulic systems to perform digging, loading, craning, and like operations. The speed and direction of the heavy equipment armatures are controlled with hydraulic valves. The controlling valves are manipulated by a skilled operator who typically uses a sense of touch to predict the probable motion of the heavy equipment. The sense of touch is the memorization of viewable mechanical motion characteristics, as they are associated with specific hand operations. It is the sense of touch that the operator relies upon to perform operations such as load movement into confined spaces and precision excavation. As the heavy equipment executes the operators commands, the hydraulic fluid moves quickly throughout the hydraulic system producing kinetic energy. The energy is transferred as vibration and heat into the hydraulic fluid, hydraulic lines, and associated equipment. The increasing heat energy reduces the viscosity of the hydraulic fluid, thus producing a decrease in fluid pressure. The decreased fluid pressure alters the motion characteristics of the heavy equipment, which affects the accuracy achievable by the operator. Thus, there is a need for a hydraulic system capable of performing systematically regardless of fluid temperature.

SUMMARY OF THE INVENTION

One aspect of the present invention provides a hydraulic system for regulating fluid pressure of heavy equipment comprising a main body, a thermal element positioned within the main body, a pin positioned adjacent to the thermal element, and an orifice spool in communication with the pin. The thermal element expands to force the pin to reposition the orifice spool, and restrict fluid flow through the main body.

Another aspect of the present invention provides a method for determining changes of pressure in a hydraulic system based on temperature changes, expanding a thermal polymer when the fluid temperature increases and contracting the thermal polymer when the temperature decreases, which meters fluid flow based on the expanding and contracting of the thermal polymer.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
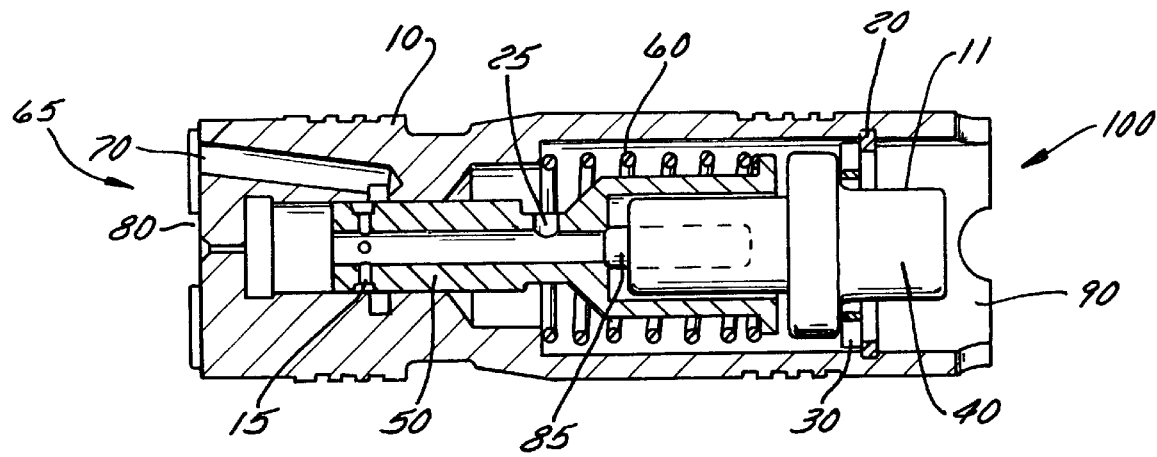
FIG. 1 is a cutaway diagram of one embodiment of a hydraulic system for regulating fluid pressure of heavy equipment in an open position, in accordance with the invention.

Referring to FIG. 1, one embodiment of a hydraulic system is generally shown at numeral 100. Components of the hydraulic system 100, also known as a temperature orifice spool, can include a main body 10, an orifice spool 50, a thermal element 40, and a pin 85. The thermal element 40 can be a temperature sensitive or 'thermal' polymer. In one embodiment, the thermal polymer is supplied by Caltherm Corporation. The main body 10, orifice spool 50 and pin 85 can be made from various rigid material including metals, polymers, or any combination thereof in alternate embodiments. In one embodiment, the main body 10 is milled to support all other components internally.

The main body 10 includes a hydraulic fluid entry 65, which, in the embodiment shown includes a primary hydraulic input 70, and a secondary hydraulic input 80. The primary hydraulic input 70 can be located on one end of the main body 10, and meters the more viscous hydraulic fluid, as when it is cold. In the center of the same end of the main body 10 can be the secondary hydraulic input 80 that meters less viscous hydraulic fluid. The hydraulic fluid entering through the primary 70 and secondary 80 hydraulic inputs may be unique to each, or may be common to both. In order to control the fluid pressure of varying temperature hydraulic fluid, it is necessary to restrict the flow of the fluid as it becomes less viscous. Thus, the diameter of the secondary hydraulic input 80 can be smaller then the primary hydraulic input 70 to achieve this purpose.

The orifice spool 50 can be in communication with the primary hydraulic input 70, the secondary hydraulic input 80, a spring 60, and the pin 85. The orifice spool 50 is hollow to allow continual passage of fluid from the secondary hydraulic input 80 to proceed through a second port 25 to a hydraulic exhaust 90. Additionally, the orifice spool 50 has metered holes 15 located on its length to allow and disallow fluid from the primary hydraulic input 70 to proceed to the second port 25, and continue on to the hydraulic exhaust 90.

The hydraulic system can also include a biasing member 60, including for example, a spring, or the like. In the embodiment shown, one end of the biasing member or spring 60 can be in communication with the interior of the main body 10, while the other end of the biasing member or spring 60 can be in communication with the orifice spool 50. In operation, in the "cold" state of the hydraulic system 100 illustrated in FIG. 1 the spring 60 is at rest. Therefore, the orifice spool 50 is held in a position allowing fluid to flow from the primary input 70 through the metered holes 15, to the second port 25. Thus, in the embodiment shown, the orifice spool 50 is biased by the biasing member 60 in an open flow position.

The thermal element 40 is positioned within the body and is in communication with the orifice spool 50 by means of the pin 85. The thermal polymer used in the thermal element 40 can be molded to any shape, and in one embodiment, is contained within a membrane or bladder 11. In one embodiment, the membrane 11 is made of rubber, but may be made of any suitable flexible and/or elastic material. The membrane 11 may fully cover the thermal element, or a portion of the thermal element that contacts with the pin 85. In one embodiment, the pin 85 is in communication with the membrane of the thermal element 40 and moves with the expansion and contraction of the thermal polymer. As the fluid temperature warms or increases, the thermal polymer expands by a measurable displacement, moving the pin 85.

Figure 2:
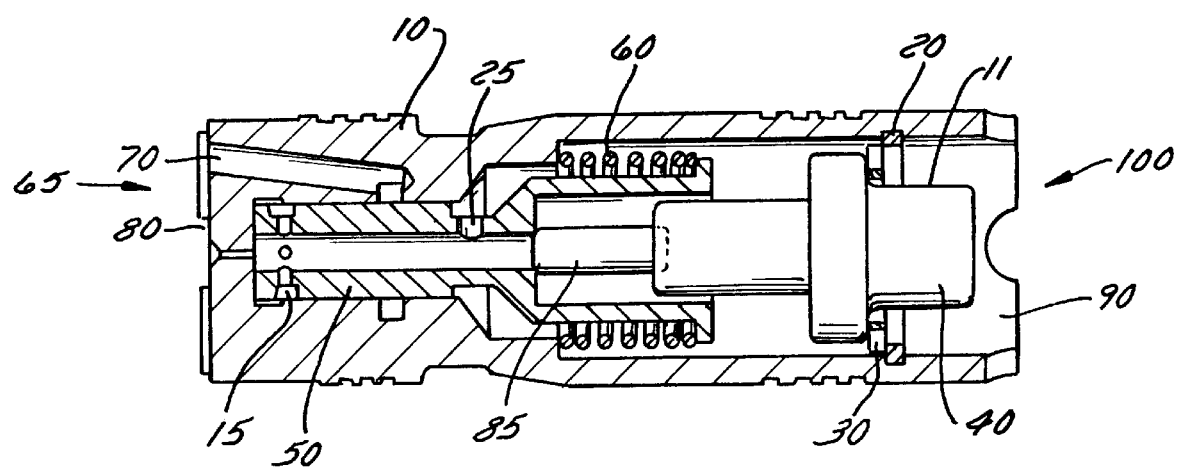
FIG. 2 is a cutaway diagram of the embodiment of FIG. 1 in a restricted position.

FIG. 2 is an exemplary illustration of the hydraulic system in the "warm" state according to one embodiment. In operation, as the fluid temperature increases, the thermal element 40 expands pushing against the membrane 11, thus forcing the pin 85 against the orifice spool 50 with enough force to compress the spring 60. As the thermal element 40 extends the pin 85, the orifice spool 50 shifts to restrict or close off the metered holes 15 and restrict fluid flow to only the secondary hydraulic input 80. As the fluid temperature decreases, the spring 60 returns the orifice spool 50 to the open flow or original "cold" position as shown in FIG. 1.

A by-pass washer 30 can be positioned in communication with the hydraulic exhaust end of the thermal element 40 to allow fluid flow around the thermal element 40. Also, a snap ring 20 can be positioned in communication with the thermal element 40 and the main body 10 to retain the components within the main body 10.

Figure 3:
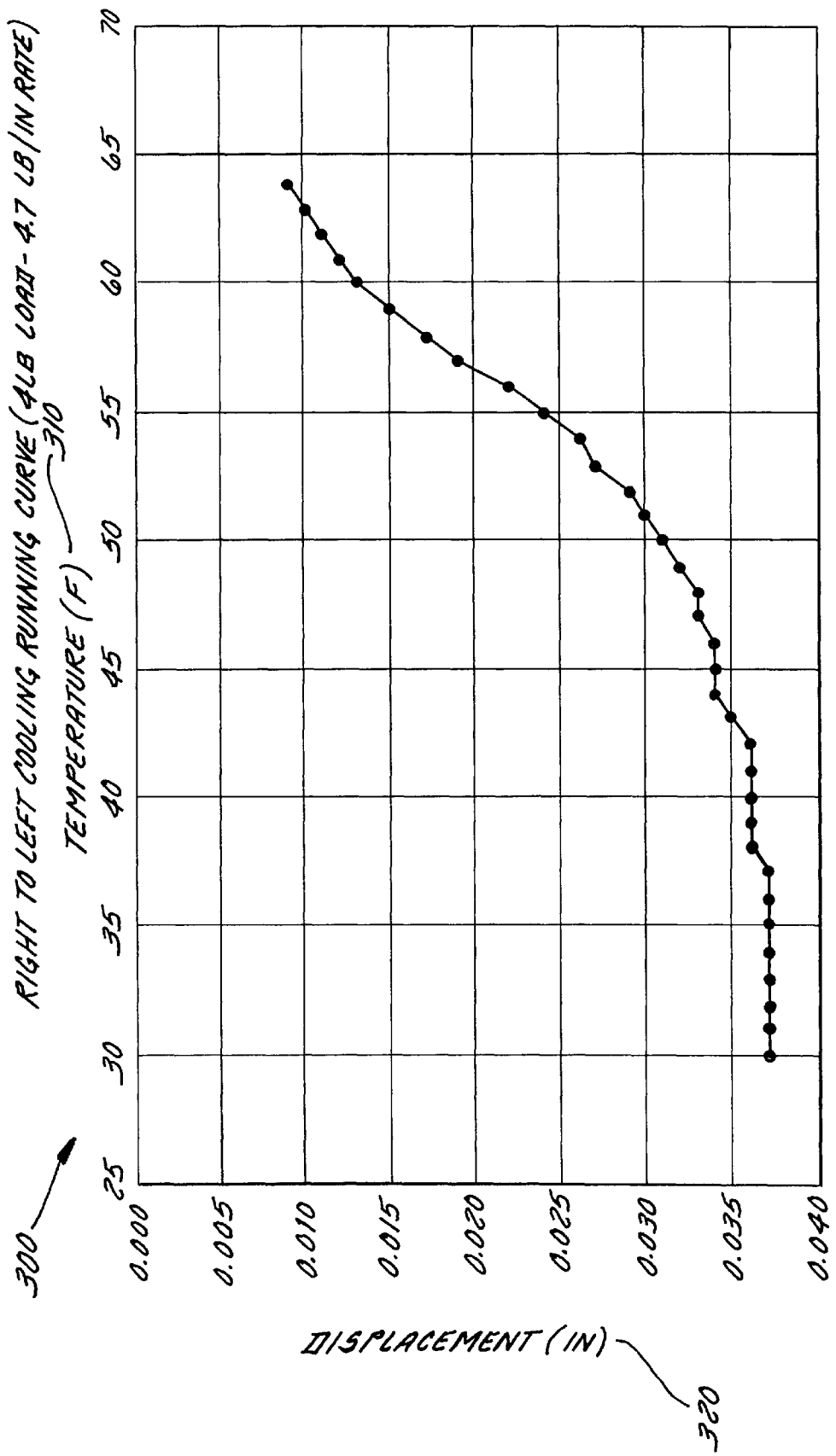
FIG. 3 is a graph depicting temperature characteristics of the embodiment of FIG. 1 in operation.

FIG. 3 depicts a graph 300 of the temperature characteristics of the thermal polymer used in one embodiment for constructing the thermal element 40. The graph 300 is viewed properly from right to left and illustrates the thermal polymer contracting, allowing the pin 85 to retract and place the temperature orifice spool 100 into its cold state. The temperature readings in degrees Fahrenheit (° F.) are shown at numeral 310. The displacement readings (in inches) are shown at numeral 320. The graphed characteristics have been tested with a 4 lb. Load at 4.7 lb/in asserted upon the thermal polymer. As the hydraulic fluid cools from 64° to 30° F., the thermal polymer shows a displacement in excess of 0.025 inches 320.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed:

1. A hydraulic system for regulating fluid pressure of heavy equipment, comprising:
    a main body;
    a thermal element positioned within the main body;
    a pin positioned adjacent to the thermal element; and
    an orifice spool in communication with the pin, wherein the thermal element is configured to expand to force the pin to reposition the orifice spool, and restrict fluid flow through the main body, the orifice spool further comprising a means to restrict fluid flow; and a means to open fluid flow.

2. The system of claim 1, wherein the thermal element is contained by a membrane.

3. The system of claim 1, wherein the thermal element is configured to expand in response to an increase in temperature.

4. The system of claim 1, wherein the thermal element is configured to contract in response to a decrease in temperature.

5. The system of claim 1, wherein all components are contained within the main body.

6. The system of claim 1, further comprising a biasing member in contact with the orifice spool to return the orifice spool to an open position when cooled.

7. The system of claim 1, further comprising a by-pass washer in communication with the thermal element to allow fluid flow around the thermal element.

8. The system of claim 1, further comprising a primary hydraulic input, formed in the main body and in communication with the orifice spool, wherein metered holes formed in the orifice spool allow fluid flow from the primary hydraulic input to a second port formed in the orifice spool.

9. The system of claim 1, further comprising a secondary hydraulic input, formed in the main body and in communication with the orifice spool wherein fluid is allowed to flow from a secondary hydraulic input to a second port, and remains open when the orifice spool is in the restricted position.

10. The system of claim 1, wherein the thermal element comprises:
    a means for moving the pin; and
    a means for allowing fluid flow around the thermal element.

11. The system of claim 1, wherein the pin comprises a means to reposition the orifice spool.

12. A hydraulic system for regulating fluid pressure of heavy equipment, comprising:
    a main body;
    a thermal element positioned within the main body;
    a pin positioned adjacent to the thermal element; and
    an orifice spool in communication with the pin, wherein the thermal element is configured to expand to force the pin to reposition the orifice spool, and restrict fluid flow through the main body, the system further comprising a snap ring in communication with the thermal element and the main body to retain the components within the main spool.

13. A hydraulic system for regulating fluid pressure of heavy equipment, comprising:
    a main body;
    a thermal element positioned within the main body;
    a pin positioned adjacent to the thermal element;
    an orifice spool in communication with the pin, wherein the thermal element is configured to expand to force the pin to reposition the orifice spool, and restrict fluid flow through the main body;
    a means for retaining the components within the main body;
    a means for providing a primary fluid flow; and
    a means for providing a secondary fluid flow.

14. A method of operating a hydraulic system to regulate fluid pressure of heavy equipment including:
    determining changes of pressure based on temperature changes;
    expanding a thermal polymer when temperature in the system increases;
    contracting the thermal polymer when the temperature in the system decreases; and
    metering fluid flow by adjusting the position of metered holes based on the expanding and contracting of the thermal polymer.

15. The method of claim 14, further comprising extending a pin while the thermal polymer is expanded.

16. The method of claim 14, further comprising retracting a pin while the thermal polymer is contracted.

17. The method of claim 14, further comprising biasing an orifice spool in an open position.

18. The method of claim 17, further comprising forcing the orifice spool to a restricting position while the thermal polymer is expanded.

19. An apparatus for regulating fluid pressure of heavy equipment, comprising:
- a means for determining changes of pressure based on temperature derivatives;
- a means for expanding a thermal polymer when temperature increases;
- a means for contracting the thermal polymer when the temperature decreases; and
- a means for metering fluid flow by adjusting the position of metered holes to accommodate a change in hydraulic fluid viscosity based on the expanding and contracting of the thermal polymer.

20. An apparatus for regulating fluid pressure in a hydraulic system, comprising:
- a main body,
- a thermal element coupled to the main body, the thermal element being configured to be mechanically responsive to temperature changes; and
- an orifice spool mechanically coupled to the thermal element, the orifice spool being configured to conduct hydraulic fluid,
- wherein the thermal element is configured to reposition the orifice spool in response to a temperature change;
- wherein the main body comprises a primary hydraulic input coupled to the orifice spool, a secondary hydraulic input coupled to the orifice spool, the secondary hydraulic input having a smaller diameter than the primary hydraulic input, and a hydraulic exhaust coupled to the orifice spool.

21. The apparatus for regulating fluid pressure according to claim 20, wherein the orifice spool comprises:
- a hollow interior; and
- at least one aperture coupled to the hollow interior.

22. The apparatus for regulating fluid pressure according to claim 21, wherein the thermal element is configured to position the orifice spool in a first position in response to the hydraulic fluid having a first viscosity and the thermal element is configured to position the orifice spool in a second position in response to the hydraulic fluid having a lower viscosity than the first viscosity.

23. The apparatus for regulating fluid pressure according to claim 21, wherein the thermal element is configured to position the at least one aperture of the orifice spool in fluid communication with the primary hydraulic input in response to the hydraulic fluid having a first viscosity and the thermal element is configured to position the at least one aperture of the orifice spool in non-fluid communication with the primary hydraulic input in response to the hydraulic fluid having a lower viscosity than the first viscosity.

24. The apparatus for regulating fluid pressure according to claim 20, wherein the thermal element is configured to expand in response to an increase in temperature and is configured to retract in response to a decrease in temperature.

25. An apparatus for regulating fluid pressure in a hydraulic system, comprising:
- a main body;
- a thermal element coupled to the main body, the thermal element being configured to adjust a flow rate of hydraulic fluid by adjusting the position of metered holes to accommodate a change in hydraulic fluid viscosity based on the temperature of the hydraulic fluid.

26. The apparatus for regulating fluid pressure according to claim 25, further comprising:
- an orifice spool; and
- a pin coupled to the thermal element and to the orifice spool, wherein the thermal element is configured to adjust a position of the pin to adjust a position of the orifice spool to adjust the flow rate of hydraulic fluid based on the temperature of the hydraulic fluid.

27. The apparatus for regulating fluid pressure according to claim 25, further comprising an orifice spool coupled to the thermal element,
- wherein the thermal element is configured to adjust a position of the orifice spool to adjust the flow rate of the hydraulic fluid based on the temperature of the hydraulic fluid.

28. The apparatus for regulating fluid pressure according to claim 27, further comprising a biasing member coupled between the orifice spool and the main body.

29. The apparatus for regulating fluid pressure according to claim 28, wherein the biasing member comprises a spring.

30. The apparatus for regulating fluid pressure according to claim 25, wherein the thermal element expands and contracts to adjust the flow rate of the hydraulic fluid based on the temperature of the hydraulic fluid.

31. A method for regulating fluid pressure in a hydraulic system, comprising:
- sensing a change in temperature; and
- changing a path diameter for hydraulic fluid to accommodate a change in hydraulic fluid viscosity in response to the change in temperature, wherein the changing step comprises adjusting the position of metered holes to accommodate a change in hydraulic fluid viscosity in response to the change in temperature.

32. The method for regulating fluid pressure in a hydraulic system according to claim 31, wherein the changing step further comprises adjusting a position of an orifice spool to accommodate the change in hydraulic fluid viscosity in response to the change in temperature.

33. The method for regulating fluid pressure in a hydraulic system according to claim 31, wherein the changing step further comprises adjusting a thermal element in response to the change in temperature to accommodate the change in hydraulic fluid viscosity.

34. The method for regulating fluid pressure in a hydraulic system according to claim 33, wherein the adjusting step further comprises at least one of expanding the thermal element in response to an increase in temperature and retracting the thermal element in response to a decrease in temperature.

35. The method for regulating fluid pressure in a hydraulic system according to claim 34, wherein the adjusting step further comprises at least one of expanding the thermal element to adjust a position of an orifice spool and contracting the thermal element to adjust a position of an orifice spool.

36. The method for regulating fluid pressure in a hydraulic system according to claim 31, further comprising expanding a thermal element in response to a first temperature and retracting the thermal element in response to a temperature less than the first temperature.

37. The method for regulating fluid pressure in a hydraulic system according to claim 31, wherein the metered holes are positioned in fluid communication with a primary input in response to a first temperature and the metered holes are positioned in non-fluid communication with the primary input in response to a temperature greater than the first temperature.

* * * * *